United States Patent [19]

Schalch et al.

[11] 4,150,277

[45] Apr. 17, 1979

[54] ELECTRODE ROLL ARRANGEMENT FOR A RESISTANCE ROLL-WELDING MACHINE

[75] Inventors: Fred Schalch, Le Landeron; Peter Schreiber, Romanshorn, both of Switzerland

[73] Assignee: Fael S.A., Saint-Blaise, Switzerland

[21] Appl. No.: 846,818

[22] Filed: Oct. 31, 1977

[30] Foreign Application Priority Data

Nov. 9, 1976 [CH] Switzerland .................... 14086/76

[51] Int. Cl.² ............................................. B23K 11/06
[52] U.S. Cl. .......................................... 219/81; 219/84
[58] Field of Search ...................... 219/81, 82, 83, 84, 219/64

[56] References Cited

U.S. PATENT DOCUMENTS 3,588,434  6/1971  Dashkevich .................. 219/81 X

Primary Examiner—E. A. Goldberg
Attorney, Agent, or Firm—Charles E. Brown

[57] ABSTRACT

An electrode roll-welding arrangement for a resistance roll-welding machine comprising a welding arm adapted to be supported at a machine frame and an electrode roll mounted at an end of the welding arm, the electrode roll being supplied with the welding current by means of the welding arm acting as an electrical conductor and a shaft of the electrode roll mounted in such welding arm. The end of the welding arm receiving the electrode roll is bifurcated or fork-shaped and embodies two fork-like or bifurcated leg members situated essentially in parallelism and opposite one another, each bifurcated leg member having a slot which opens towards the front side or face of the end of the welding arm. Each such slot has at its inward or proximal slot end a bearing cradle for the reception of the shaft of the electrode roll. A clamping element is arranged in each slot and each such clamping element is urged with its contact surfaces against the shaft of the electrode roll as well as against the slot walls in the welding arm by means of an adjustable pressure element which is arranged at the end of each leg member of the welding arm.

9 Claims, 1 Drawing Figure

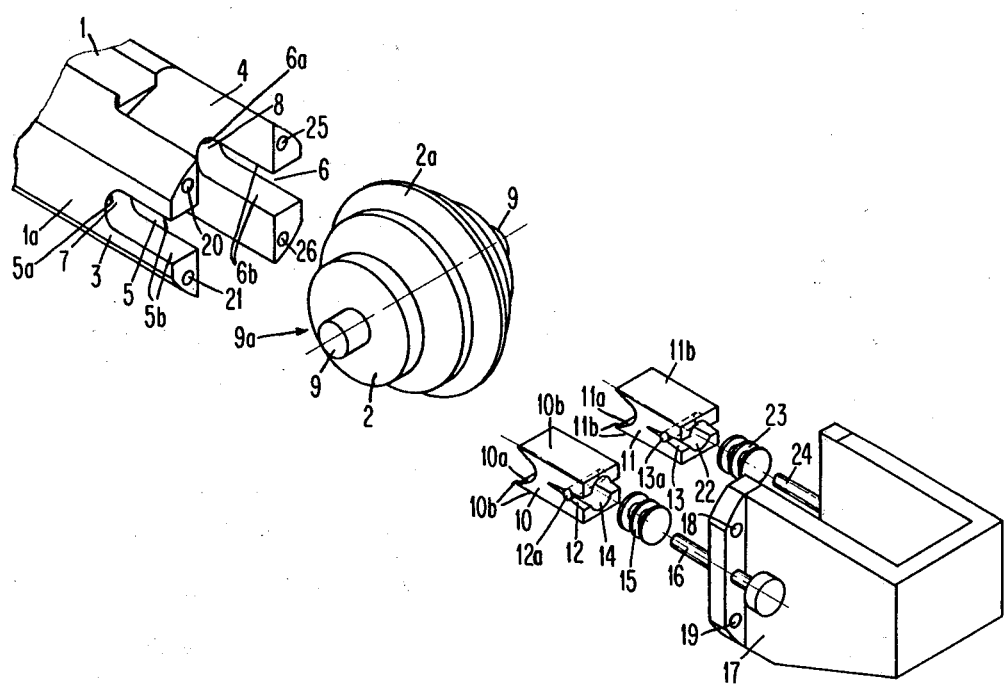

ELECTRODE ROLL ARRANGEMENT FOR A RESISTANCE ROLL-WELDING MACHINE

BACKGROUND OF THE INVENTION

The present invention broadly relates to the art of resistance roll-welding machines—also referred to as electrical resistance-roll seam welding machines—and, more specifically, is concerned with a new and improved construction of a welding roll arrangement for such resistance roll-welding machine, which is of the type comprising a welding arm arranged at the machine frame and an electrode roll mounted at an end of the welding arm, the welding current being delivered to the electrode roll by means of the welding arm which functions as an electrical conductor and the shaft of the electrode roll which is mounted in such welding arm.

With heretofore known resistance roll-welding machines of the previously described type, the front end of the welding arm, which is of fork-like or bifurcated structure for the reception of the electrode roll, is divided in a plane extending along the shaft center of the electrode roll, and in each of the parts there is formed a semi-circular-shaped bearing trough or cradle for the reception of the shaft. The shaft is fixedly clamped between the parts which are interconnected with one another by screws. To produce a clamping action with this construction, it is necessary to provide a spacing between the parts in the separation or parting plane and which parts are interconnected by the screws extending perpendicular to the parting plane.

This type of mounting of the electrode roll has been chosen in order to be able to exactly adjust its elevational position, so that it is dispositioned in the proper location with respect to other machine parts serving for guiding the workpieces which are to be welded to the electrode rolls. For this purpose the shaft is eccentric with regard to the roll which is rotatably mounted thereon. Hence, to carry out the desired adjustment the clamping screws must be loosened in order to be able to rotate the shaft.

A notable drawback of this manner of attaching the electrode roll-shaft in the welding arm resides in the fact that owing to the bearing fork which is divided at the center of the shaft, the current flow from the welding arm to the shaft at the one side is accomplished without any difficulty by means of the semi-circular-shaped bearing cradle, yet the current flow to the end of the bearing fork which is pressed against the shaft at the other side of the parting plane can only be accomplished by means of the screws serving for fixedly clamping the shaft. This circumstance obviously is associated with a poorer current transfer or flow than would be the case if there were not present any reduction in the cross-section at the current conducting path, since then there would be present a smaller contact or transfer resistance and a smaller voltage drop, resulting in lower heat development at the electrode roll. By virtue of the fact that all possible expedients are employed for cooling the electrode roll, it is therefore of decisive importance if the development of heat, associated with the current transfer, is maintained as small as possible.

In the case of the heretofore known resistance roll-welding machines having the described electrode roll mounting or support at the end of the welding arm, it is furthermore to be noted that the bearing fork end serving for fixedly clamping the shaft of the electrode roll is constructed as a general rule as a support or directly connected with a support in which there are mounted working tools following the electrode rolls, such as for instance a pressure roll. Frequently there are also connected further auxilliary devices at the end of the welding arm which is mounted in a cantilever fashion at the machine frame. The welding arm is located internally of the body of the workpiece which, after the welding operation, has a cylindrical shell-like configuration, and it is for this reason for instance that there can be arranged a device for applying lacquer or varnish or the like to the inside of the finished welding seam also at such type support at the end of the welding arm.

A further drawback of the state-of-the-art electrode roll mounting arrangement resides in the fact that for the adjustment of the electrode roll, by adjusting the eccentric shaft relative to the roll, it is necessary to release the clamping screws at the bearing fork end each time, and therefore, to equally loosen the support carrying the subsequently arranged working tools, and after accomplishing the adjustment of the electrode roll to again fixedly clamp such in exact alignment with the welding arm. A further difficulty which is associated with this construction resides in the fact that owing to the spacing at the parting or separation plane of the bearing fork and which is needed for obtaining a clamping action, the exact adjustment of the support in aligned relationship with regard to the welding arm requires each time a great deal of attention.

SUMMARY OF THE INVENTION

Therefore, with the foregoing in mind it is a primary object of the present invention to provide a new and improved construction of an electrode roll-welding arrangement for a resistance roll-welding machine which is not associated with the aforementioned drawbacks and difficulties of the prior art constructions.

Another and more specific object of the present invention aims at not only eliminating the aforementioned drawbacks, but furthermore, contemplates mounting the electrode roll in the welding arm in such a fashion that, firstly, there is obtained a considerably better current transfer from the welding arm to the electrode roll, providing for a smaller transfer resistance, a smaller voltage drop and thus a smaller development of heat, and, secondly, rendering possible the adjustment of the electrode roll at any time without the need for loosening the support arranged at the end of the welding arm and the devices for the subsequent working operations which are arranged at such support.

Still a further significant object of the present invention concerns a new and improved construction of an electrode roll-welding arrangement for supporting an electrode roll in an extemely simple, efficient and accurate manner, enabling readjustment of the roll with relatively few and inconsequential manipulations and operations, while improving the current transfer from the welding arm to the electrode roll.

Now in order to implement these and still further objects of the invention, which will become more readily apparent as the description proceeds, the electrode roll-welding arrangement for a resistance roll-welding machine is manifested by the features that the end of the welding arm receiving the electrode roll is bifurcated or fork-shaped and contains two fork-like or bifurcated leg members or legs situated essentially in parallelism and opposite one another. Each bifurcated leg member has a slot which opens towards the front side or face of the end of the welding arm. Each such slot has at its inward or proximal slot end a bearing cradle or trough for the reception of the shaft of the electrode roll. A clamping element or clamp is arranged in each slot and each such clamping element is urged with its contact surfaces against the shaft of the electrode roll as well as against the slot walls in the welding arm by means of an adjustable pressure element arranged at the end of each leg member of the welding arm.

A support for working tools which follow the electrode roll is preferably threaded to the front ends of the aforementioned leg members of the welding arm. This support or support member covers in a bridge-like manner the slots in the leg members and possesses a respective adjustment screw positioned along the extension of the center line of each slot, each such adjustment screw serving as a pressure element for pressing the support against the associated clamping elements. In this manner it is possible to ensure that the support can always remain fixedly connected with the end of the welding arm when, for the purpose of adjusting the eccentric of the shaft of the electrode roll, there is released or loosened the clamping attachment or connection provided by the clamping elements by loosening the adjustment screws.

To ensure for proper contact of each of the clamping elements against the shaft of the elctrode roll as well as also against the slot walls, a preferred further constructional manifestation of the invention contemplates structuring each clamping element to be lengthwise slotted along the center line extending in the lengthwise direction of the related slot and urging such with a wedge action against the opposite slot walls and the shaft of the electrode roll. Due to this construction there is beneficially accomplished, in contrast to prior art constructions of the electrode roll mounting, a positive current transfer from the welding arm to the shaft of the electrode roll also at the side at which there is fixedly clamped the shaft, since the clamping elements bear with the entire surface of their oppositely situated outer sides against the slot walls of the welding arm. In order to obtain an optimum current transfer it is advantageous to additionally coat each clamping element at the surfaces coming into contact with the inner walls of the related slot and the shaft of the electrode roll with a noble metal, for instance silver.

In order that each clamping element or clamp has uniformly applied thereto the requisite contact pressure, there is advantageously arranged a resilient element between the clamping element and the pressure element for purposes of compensating thermal expansions. Such resilient element advantageously comprises a package of plate springs or equivalent structure arranged in a bore of the related clamping element and against which acts the pressure element, for instance in the form of the adjustment or setting screw.

BRIEF DESCRIPTION OF THE DRAWING

The invention will be better understood and objects other than those set forth above, will become apparent when consideration is given to the following detailed description thereof. Such description makes reference to the annexed drawing wherein the single FIGURE shows in perspective exploded view a preferred embodiment of support or mounting arrangement for the electrode roll at the end of the welding arm together with a support arranged thereafter.

DETAILED DESCRIPTION OF THE PREFERRED EMBODIMENTS

Describing now the drawing, it is to be understood that the drawing only shows as a matter of convenience in illustration details of the electrode roll-welding arrangement, and specifically, the support for the roller electrode as contemplated by the invention, there having been conveniently omitted the showing of the resistance roll-welding machine with which such electrode roll-welding arrangement is used since the structure and details thereof are unimportant for understanding the underlying principles and concepts of the present invention. An exemplary embodiment of resistance roll-welding machine, by means of which for instance can bodies can be produced from rounded or bent blanks by welding the edges of the blanks, and with which for instance the electrode roll-welding arrangement could be employed, has been disclosed for instance in the commonly assigned U.S. application, Ser. No. 846,633, filed Oct. 31, 1977, and entitled "Electrical Resistance-Roll Seam Welding Machine" to which reference may be readily had and the disclosure of which is incorporated herein by reference. The electrode roll-welding arrangement for such type resistance roll-welding machine and other resistance-roll welding machines, will be seen to comprise a welding arm 1 arranged in a cantilever fashion at a not particularly shown machine frame of the welding machine, the welding arm 1 generally being horizontally arranged at such machine frame. To simplify the showing of the drawing the front end of the welding arm 1 has been shown in simplified perspective and schematic view. This welding arm 1 possesses a bifurcated or fork-like construction at the end 1a intended to receive the electrode roll 2. The bifurcated end 1a of the welding arm 1 embodies two fork-like or bifurcated leg members or legs 3 and 4 which are arranged opposite one another in confronting relationship and essentially in parallelism to one another. Each of the bifurcated legs or leg members 3 and 4 have a respective slot 5 and 6 which is open towards the front side or face of the welding arm 1. These slots 5 and 6 are constructed at the inward or proximal slot ends 5a and 6a, respectively, as substantially semicircular bearing cradles or troughs 7 and 8, respectively, serving to receive the shaft 9 of the electrode roll 2.

The welding arm 1 constitutes an electrical conductor for the transmission or transfer of the welding current, at a high current intensity needed for the resistance welding, to the electrode roll 2 which is mounted at the fiburcated end 1a of the welding arm 1. The current is delivered by means of the shaft 9 to the electrode roll 2, this shaft 9 being fixedly clamped in the welding arm 1, in a manner which will be more fully explained hereinafter. The electrode roll-shaft 9 is somewhat eccentrically arranged in relation to the rotating part 2a of the electrode roll 2, in order to be able to alter the elevational position of the electrode roll 2 by appropriately adjusting the eccentric arrangement, generally indicated by reference character 9a. By means of roller bearings arranged internally of the electrode roll 2 and which have not been particularly shown in the drawing to simplify the illustration, especially since such structure is conventional, it is possible to rotate the outer part 2a of the electrode roll 2 upon the shaft 9.

The current transfer from the welding arm 1 to one-half of the peripheral surface of the shaft 9, and specifically to both oppositely situated ends of such shaft, is accomplished by means of the bearing cradles 7 and 8 at the inward or proximal ends of the slots 5 and 6, respectively. To ensure that there is an equally good current transfer also to both halfs of the peripheral surfaces of the shaft 9 which face away from the bearing troughs 7 and 8, there are arranged in both of the slots 5 and 6 the clamping elements 10 and 11, respectively. These clamping elements 10 and 11 are rounded at their respective front ends 10a and 11a in accordance with the shape of the shaft 9 and are exactly accommodated in their height to the inner width of such slots 5 and 6 respectively. The surfaces 10b and 11b of the clamping elements 10 and 11, respectively, which come into contact with the shaft 9 and with the bounding walls 5b and 6b of the slots 5 and 6, respectively, are advantageously coated with a noble metal, for instance silver. The clamping elements 10 and 11 furthermore are provided with wedge-shaped slots 12 and 13, respectively, at the central lengthwise extending region thereof, and in each such slot 12 and 13 there is inserted a pin 12a and 13a, respectively, in order to spread the clamping elements 12 and 13, so that during contact of each clamping element 12 and 13 against the shaft 9 there is achieved a wedge action with the result that there is beneficially attained a complete surface contact between the current-transmitting surfaces. The current flows from the legs or leg members 3 and 4 of the welding arm 1 above and below each slot 5 and 6 via the clamping elements 10 and 11 to the shaft 9 of the electrode roll 2 and is not hindered in its flow along this path by any constriction of a cross-section as was the case heretofore with the prior art mounting arrangements of the electrode roll.

A bore 14 in the clamping element or clamp 10 serves for the reception of a resilient or spring element 15. Pressing against the resilient element 15 is an adjustment or setting screw 16 or equivalent structure, which is adjustably arranged in the support or support member 17. This support 17 is fixedly threaded or otherwise conveniently attached by means of four screws (not shown in the drawing) to the front side or end of the welding arm 1, such screws or equivalent fastening expedients extending through the bores 18 and 19 provided at the support 17 and through the threaded bores 20 and 21 provided at the end 1a of the welding arm 1.

The identically constructed clamping element or clamp 11 likewise possesses a resilient or spring element 23 arranged in a bore 22, and against which resilient element 23 there presses an adjustment or setting screw 24. At this side the support 17 is affixed in the same manner by means of not particularly illustrated screws or equivalent structure which extend through the non-visible bores of the support, similar to the bores 18 and 19 discussed above, and through the threaded bores 25 and 26 at the end 1a of the welding arm 1.

By means of the adjustment or setting screws 16 and 24 there can be adjusted the requisite contact pressure at the clamping elements 10 and 11, respectively, and the related resilient elements 15 and 23 serve to take-up thermal expansions.

The support 17 carries suitable working or processing tools, not particularly shown in the drawing to preserve clarity in illustration, which, following the welding operation, work the welding seam and the blank edges, respectively, for instance a pressure roll. But of course still other devices could be suspended at the support, such as for instance a device for applying varnish or lacquer to the welding seam, so that depending upon the number of working or operating steps which are to be further carried out with the machine, apart from the welding operation, a relatively large extension must be flanged in a cantilever arrangement to the welding arm, since all additional working or processing tools are located within the cylindrical-shaped blanks or bodies of the can and which are transported along the welding arm and the extension. By virtue of this construction there is realized the advantage of the previously described mounting of the electrode roll, which resides in the fact that for adjusting the electrode roll by adjusting the eccentric it is only necessary to loosen both of the adjustment screws, without, for this purpose, having to loosen or detach the support carrying the further work or processing tools.

While there are shown and described present preferred embodiments of the invention, it is to be distinctly understood that the invention is not limited thereto, but may be otherwise variously embodied and practiced within the scope of the following claims.

ACCORDINGLY,

What we claim is:

1. An electrode roll-welding arrangement for supporting an electrode roll of a resistance roll-welding machine, comprising:
    a welding arm adapted to be supported by a frame of the resistance roll-welding machine;
    said welding arm having a bifurcated end comprising two bifurcated leg members situated essentially in parallelism and opposite one another;
    an electrode roll;
    a shaft member carried by said electrode roll and mounted in the bifurcated end of said welding arm;
    each bifurcated leg member having a slot which opens towards a front side of the bifurcated end of said welding arm;
    each slot having inner walls and an inward end provided with a bearing cradle for the reception of said shaft member of said electrode roll;
    a respective clamping element arranged in each slot;
    each clamping element having contact surfaces for contacting the shaft of the electrode roll and said inner walls of the related slot;
    a respective adjustable pressure element arranged at the end of each leg member of the welding arm for urging the related clamping element and its contact surfaces against the shaft of the electrode roll and against the walls of the related slot in the welding arm.

2. The electrode roll-welding arrangement as defined in claim 1, further including:
    a support member;
    each of the bifurcated leg members of the welding arm having end face means at the region of the open end of the related slot;
    means for securing the support member at the end face means of the leg members of the welding arm in a manner wherein said support member bridges said leg members of the welding arm; and
    said respective adjustable pressure element comprising an adjustment screw disposed along an extension of the central line of the related slot for pressing against the related clamping element.

3. The electrode roll-welding arrangement as defined in claim 1, wherein:
    each clamping element is slotted in a lengthwise direction along a central line thereof extending in the lengthwise direction of the related slot and being pressed with a wedge action against oppositely situated walls of such related slot and said shaft member of the electrode roll.

4. The electrode roll-welding arrangement as defined in claim 1, wherein:
said contact surfaces of each clamping element which come into contact with the inner walls of the related slot and the shaft member of the electrode roll have a coating of a noble metal.

5. The electrode roll-welding arrangement as defined in claim 4, wherein:
said noble metal-coating is silver.

6. The electrode roll-welding arrangement as defined in claim 1, further including:
a respective resilient element arrranged between each clamping element and its related pressure element.

7. The electrode roll-welding arrangement as defined in claim 6, wherein:
each clamping element has a bore;
each said resilient element comprising a package of plate springs arranged in the bore of the related clamping element; and
each pressure element bearing with pressure against the related package of plate springs.

8. The electrode roll-welding arrangement of claim 1 wherein each clamping element has a rigid end portion bearing said contact surface for engaging said electrode roll shaft and a transversely deformable opposite end portion for wedging contact with said slot inner walls, said opposite end portion being of a split construction, and there being means within said opposite end portion responsive to pressure exerted by the respective pressure element for wedging said contact surfaces for engaging said inner walls transversely apart and into pressure contact with said inner walls.

9. The electrode roll-welding arrangement of claim 8 wherein said means within said opposite end portion is in the form of a pin extending parallel to said inner walls.

* * * * *